Aug. 11, 1959   T. J. R. BRIGHT   2,898,648
DRAUGHT EXCLUDING STRIPS AND MOUNTING MEANS THEREFOR
Filed Feb. 7, 1955   4 Sheets-Sheet 1

INVENTOR
Thomas J.R. Bright
BY Stevens, Davis, Miller & Mosher
ATTORNEYS

Aug. 11, 1959 T. J. R. BRIGHT 2,898,648
DRAUGHT EXCLUDING STRIPS AND MOUNTING MEANS THEREFOR
Filed Feb. 7, 1955 4 Sheets-Sheet 3
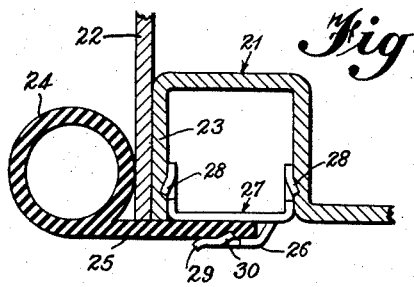
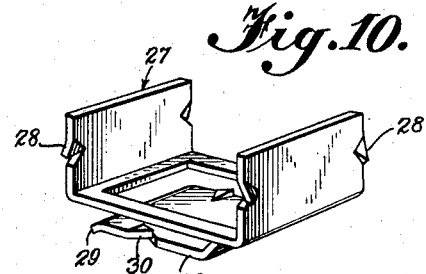
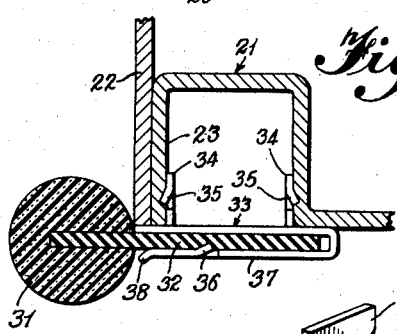
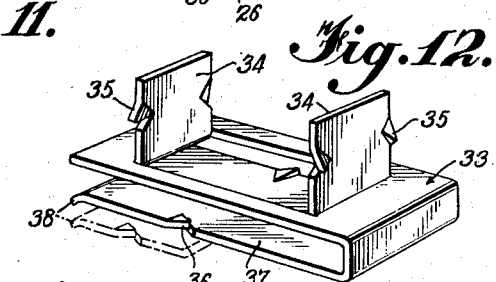
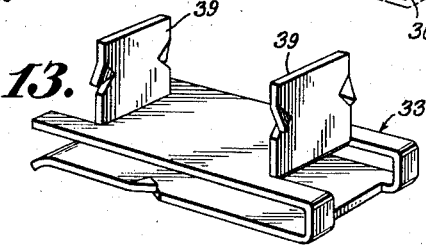
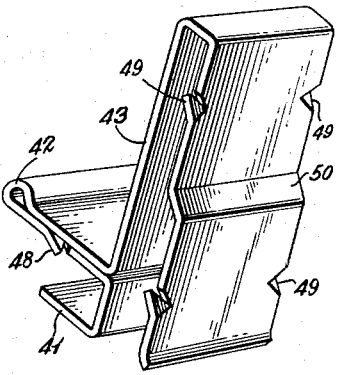
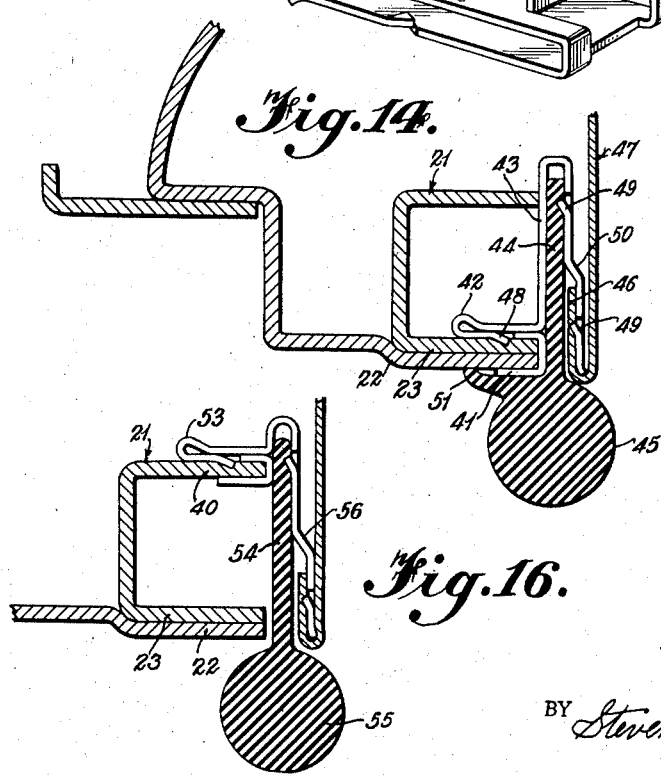
INVENTOR
Thomas J. R. Bright
BY Stevens, Davis, Miller & Mosher
ATTORNEYS United States Patent Office 2,898,648
Patented Aug. 11, 1959

2,898,648

DRAUGHT EXCLUDING STRIPS AND MOUNTING MEANS THEREFOR

Thomas John Robert Bright, Leek Wootton, Warwick, England

Application February 7, 1955, Serial No. 486,657

3 Claims. (Cl. 20—69)

This invention relates to draught excluding strips and mounting means therefor and is concerned primarily with such strips adapted for installation in and support from the channel shaped groove which, in conventional vehicle construction, contains a wooden tacking strip. This application is a continuation-in-part of Serial Number 309,691 filed September 15, 1952, which has now been abandoned.

It is conventional in the construction of vehicle bodies such as automobile bodies to have a draught excluding strip between the door and its frame. To this end a channel is formed in the body adjacent to the door opening and a wooden tacking strip is located in the channel. The beading or molding used as the draught excluder strip is provided with a flange and this flange is attached to the wooden tacking strip by tacks or screws, the flange being covered, for appearance sake, by a trim.

In the prior application of which this application is a continuation-in-part there are shown a number of metal mounting means adapted to supersede the wooden tacking strip in holding the beading flange from the channel surrounding the door. Such mounting means have the advantage of being more durable yet less costly in labor than the tacks in wood system while causing the finished job to present a better appearance. In the species of mounting means newly presented in this application, the advantages of the other forms are retained while a still greater degree of simplification is achieved.

It is an object of this invention to provide a draught excluding strip of simple construction and good appearance which is characterized by a low installation cost and a high degree of durability.

Other objects and advantages of this invention will be apparent from the following detailed description of numerous embodiments thereof in conjunction with the annexed drawings wherein:

Figures 9 and 11 are sectional views illustrating two alternative forms of sealing strip and two alternative forms of mounting clip;

Figures 10 and 12 are perspective views of the two types of clips illustrated in Figures 9 and 11 respectively;

Figure 13 is a perspective view of a further modified form of clip;

Figures 14 and 16 are sectional views illustrating two alternative types of sealing strip and associated clip modified to secure a vehicle head lining in position;

Figure 15 is a perspective view of the clip shown in Figure 14;

Figure 1:
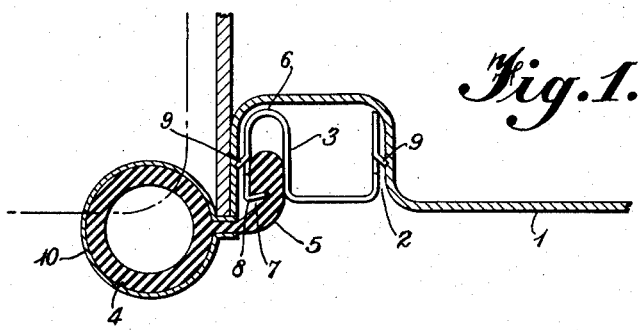
Figure 1 is a sectional view showing a sealing strip in accordance with the invention mounted in position.

Referring in the first case to Figure 1, the door pillar or other component part of the vehicle body is designated generally by reference numeral 1 (the position of the door when closed being indicated by dotted lines) and it will be seen that the component 1 is formed with a channel shaped groove 2 which in the prior art construction accommodates a wooden or similar tacking strip to which the sealing strip is tacked and is partially covered by means of a trimming strip screwed or otherwise secured in position.

Figure 2:
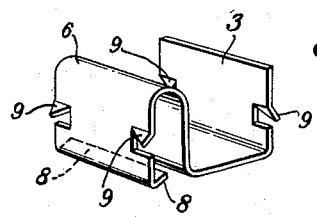
Figure 2 is a perspective view of the mounting means used in the installation shown in Figure 1.

In the construction of the present invention the wooden tacking strip is not used and the channel shaped groove is used to accommodate a series of metal or other clips 3, one of the clips being shown separately in Figure 2, the clips being arranged in spaced relationship in the groove 2 and serving to maintain the sealing strip in position.

In Figure 1 the sealing strip which may be conveniently molded or extruded from rubber or other comparatively soft but resilient material comprises a tubular effective portion 4 and an attachment portion 5, the latter being of substantially right angle configuration, the extremity of the attachment portion entering the clips and being held firmly therein.

In Figure 1 the clip includes a channel shaped part 6 into which the extremity of the attachment portion enters, the attachment portion being formed with a longitudinal notch or recess 7 which is entered by a lip 8 which is formed on one edge of the clip, thus locking the sealing strip in position.

The walls of the notch or recess in the attachment portion are inclined as shown in Figure 1, whilst the lip 8 is inclined upwardly to facilitate interengagement of the lip and the attachment portion and prevent the latter's accidental detachment.

In Figures 1 and 2 each clip is formed with outwardly directed pressed out tangs 9 on either side which make good frictional engagement with the walls of the channel shaped recess 2, the clips being of an inherently resilient construction, thus being maintained firmly in position within their associated channel shaped recess. The tangs 9 are inclined in such a way as to facilitate insertion, but to prevent accidental removal or displacement. As will be seen clearly from Figure 1, the extremity of the attachment portion is sandwiched into the channel shaped part into which it fits and consequently when the clips have been pressed into position within the channel shaped groove they will lock the attachment portion in position and at the same time maintain their own position within the groove.

The effective portion may be conveniently covered with an external fabric or other covering surface 10 to give the strip a more ornamental appearance. Alternatively, this covering may be in the form of a suitable covering material which is sprayed on or otherwise applied or the effective portion during manufacture may have an external pattern or configuration applied to its surface during the molding or extruding operation.

Figure 3:
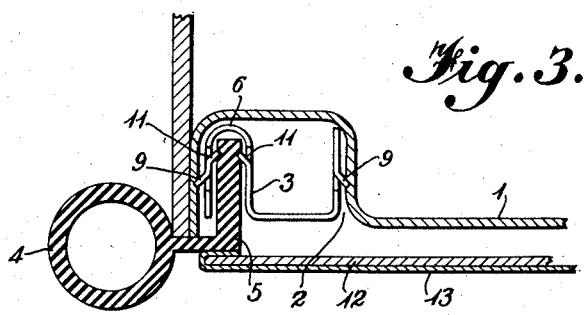
Figure 3 is a similar view to Figure 1, but illustrating an alternative form of sealing strip.

Referring now to Figure 3 which illustrates a sealing strip of a slightly modified construction in this case the attachment portion is of truly right angle section and instead of the attachment portion being formed with a notch or recess for the entry of one or more lips on the clips, the attachment portion is frictionally held in position within a channel shaped part of each clip into which it is adapted to enter. In this case the clips are not only formed with outwardly directed tangs 9, but are formed with inwardly directed tangs 11 which tangs bite into the surface of the attachement portion and thus frictionally locate the latter in position within the channel in the clip provided for its reception.

In Figure 3 a trimming strip 12 having a fabric or other covering 13 is shown in position and it will be appreciated that in the case of Figure 1 such a trimming strip will also be employed, but has been omitted.

Figure 4:
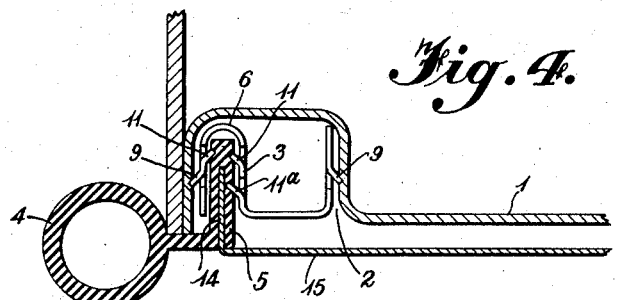
Figure 4 is a similar view illustrating a modification.

Referring now to Figure 4 which illustrates a slight modification of the construction shown in Figure 3, the attachment portion in this case is formed with a slit or groove 14 which is provided for the entry of a fabric or other trimming strip 15 or other fabric component of a vehicle body, the edge of the fabric being pressed into this slit during its application, thus securing the edge of the fabric in position in a neat manner and held securely in position by means of internally directed tangs 11a protruding through the attachment portion 5. Alternatively the trim covering material may be pressed between the attachment portion 5 and the side of the clip member 3.

Figure 5:
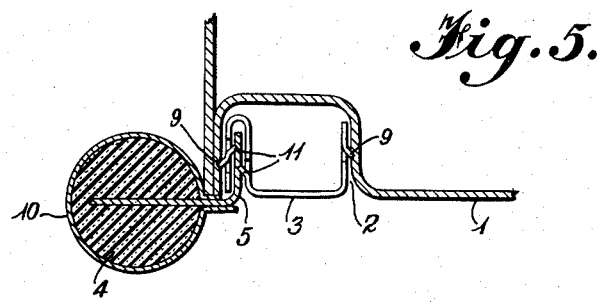
Figures 5 to 8 are sectional views each illustrating a further modification of the invention.
Figure 6:
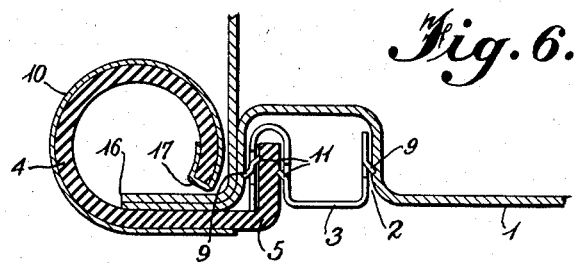

In the constructions previously described the effective portion shown was of tubular form but it will be appreciated that the effective portion may be of any other suitable form which will provide the sealing effect desired. For example, in Figure 5 the general construction is similar to Figure 3 but in this case the effective portion is composed of sponge rubber and has embedded in it an attachment portion 5 of fabric or other suitable material which is stiffened by means of a wire insert or zig-zag formation lying longitudinally of the strip. The sponge rubber component is preferably enclosed by a woven fabric or other covering 10. In Figure 6 the effective portion is of what can conveniently be termed split tubular form, the effective portion 4 forming a continuation of the attachment portion 5. In this case the strip is associated with a flange 16 on the vehicle body, the extremity 17 of the effective portion engaging the flange under the closing action of the door.

Figure 7:
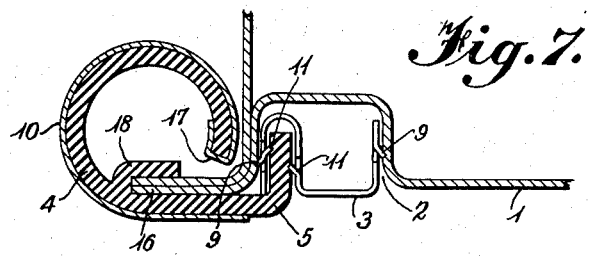

In the case of Figure 7 which illustrates a slight modification of Figure 6 the effective portion 4 is formed with an inwardly arranged lip 18 which overlies the edge of the flange and assists in holding the strip in position thereon. In both constructions the strip is preferably covered by a woven fabric or other covering 10.

Figure 8:
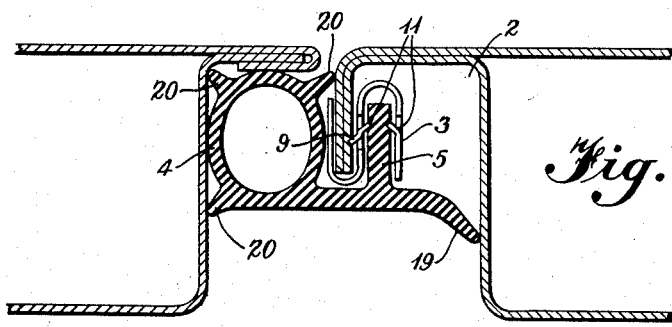

In Figure 8 is shown a further modified construction in which the clips are actually applied to the metal body edge as distinct from being mounted wholly within the channel shaped groove. In this case the effective portion 4 is of tubular form, the attachment portion 5 being extended laterally as at 19 to cover the mouth of the groove 2 and thus avoid the necessity for the use of a trimming strip. Furthermore, the effective part has a number of externally arranged lips 20 which assist in ensuring a good seal and protect the clips from the action of rain or other moisture.

It will be appreciated that where the door pillars and other substantially vertical components of a vehicle body merge into the roof that the channel shaped recess provided to accommodate the tacking strip will lie adjacent the edge of the roof lining and it is proposed, therefore, in accordance with a further feature of the invention that some or all of the clips which occupy such a position in the vehicle shall be extended or otherwise formed as to carry the edge of the roof lining. One convenient method of carrying this part of the invention into effect is to form some or all of the clips with arm-like extensions which can embrace a wire or other stiff metal edging for the roof lining, the edge of the roof lining being wrapped around the wire edge and at the same time held tight so as to insure a neat and attractive edge extending along the upper edges of the vehicle doors and windows.

In Figures 9 and 10 the channel section is indicated generally by reference numeral 21. This channel shaped component lies adjacent a second component 22 which in conjunction with one side of the channel provides a comparatively thick flange indicated generally by reference numeral 23. The strip includes an effective portion 24 of tubular form and a laterally offset attachment portion 25 arranged substantially tangentially to the tubular part which attachment portion is frictionally engaged by a pressed out limb 26 on an inverted channel section clip 27 formed from spring steel so that when pressed into the channel it will retain its position therein. In this case the limbs of the clip which enter the channel are formed with pressed out pointed tangs 28 which do not to any material extent resist introduction of the clip into the channel, but bite into the surfaces of the channel and thus resist removal of the clip. The limb 26 is bent as at 29 to provide a lead for the entry of the attachment portion 25 and is provided with upwardly directed pointed tangs 30 which tend to bite into the attachment portion and resist its withdrawal.

In the case of Figures 11 and 12 the body parts again bear numerals 21, 22 and 23, the sealing strip includes an effective portion 31 and attachment portion 32 and in this case the components are constructed separately, the effective portion being in the form of a round length of sponge rubber or similar soft but resilient material, whilst the attachment portion may be composed of rubber, fabric or other suitable material bonded or otherwise secured to the effective portion. The clip which is more clearly shown in Figure 12 is indicated generally by reference numeral 33. The clip in this case includes a pair of pressed out upwardly extending limbs 34 which are intended to enter the channel 21, the clip 33 being bent into elongated channel formation at 37 to receive the attachment portion 32. The clip is again provided with pointed tangs 35 and 36 for engagement with the walls of the channel and the attachment portion respectively, the lower limb of the clip being again bent as at 38 to provide a lead for the attachment portion and this part may alternatively be shaped as indicated by dotted lines so as to give increased width to accommodate also the edge of a roof lining or a covering material, such as for example some form of trim.

Figure 13 shows a slightly modified form of clip in which the upstanding limbs 39 instead of being pressed upwardly and outwardly as in Figure 12 are pressed upwardly and inwardly. Otherwise the construction conforms to that shown in Figure 12.

Figures 14 and 16 illustrate two clips which it is proposed to employ alternatively in places on a vehicle body, for example, along the upper edges of the door openings adjacent the head lining, the clips performing the dual function of holding the sealing strip in position and also the head lining. In this case instead of the clip engaging the inner surfaces of the channel, it is sprung over either the comparatively thick flange 23, or alternatively over the upper and thinner flange 40 as in Figure 16.

Referring in the first case to Figures 14 and 15, the clip is bent up preferably from strip steel and is preferably subsequently tempered, the clip including a channel shaped part 41 which is sprung over the flange 23, the clip being folded over as at 42 and then continued upwardly to provide a thickened channel shaped part 43 which lies at right angles to the channel shaped part 41 and which serves to receive the attachment portion 44 of the sealing strip 45, and also the edge 46 of the head lining generally indicated by reference numeral 47. The channel shaped part 41 is formed with pressed out tangs 48 which grip the flange 23, whilst the channel shaped part 43 is formed with pressed out tanks 49 which grip the attachment portion. The outer limb of the part 43 is kinked outwardly as at 50 to accommodate the edge 46 of the head lining.

In Figure 14 the sealing strip takes the form of a rubber or other soft but resilient molding, including a round, solid section, effective portion 45 and an integral attachment portion 44, the effective portion 45 being provided with an integral lip 51 which engages the flange 23 and serves to exclude moisture from the interior of the channel and from contact with the clips.

In the case of Figure 16, the clip instead of being associated with the flange 23 is associated with the upper part 40 of the channel 21, the clip being bent back upon itself as at 53 and thence upwardly and downwardly to form the channel part which receives the attachment portion 54 which projects radially from the round, solid section, effective portion 55. In this case again the defining limb of the channel is kinked as at 56 to accommodate the edge of the head lining.

Figure 17:
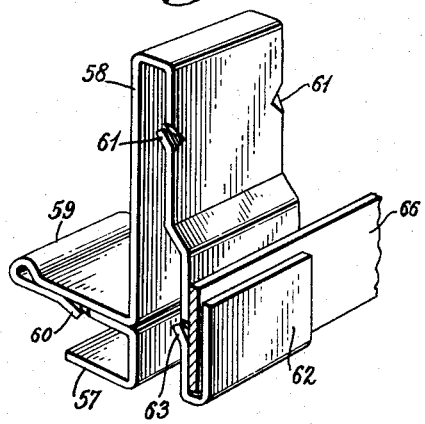
Figures 17, 18 and 19 are perspective views illustrating three further modified constructions of clips for performing the dual purpose of holding the sealing strip in position and also the roof lining.
Figure 18:
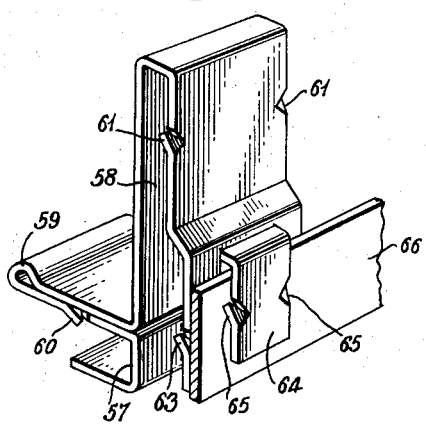
Figure 19:
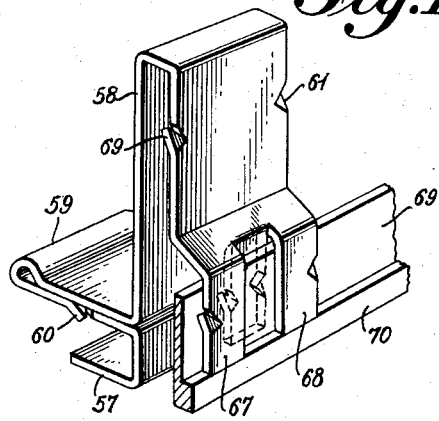
Figure 20:
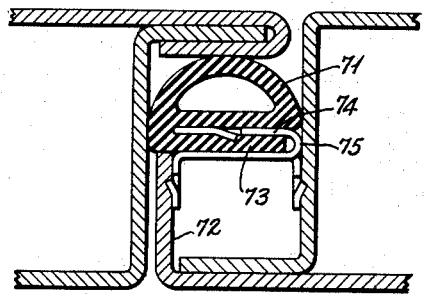
Figure 20 is a sectional view illustrating a further modified form of sealing strip and its associated clip.

In Figures 17, 18 and 19 there are illustrated three species of clips all of which are generally similar to the clip shown in Figure 15. Each of these clips includes a shallow channel shaped part 57 corresponding to the part 41 of Figure 15, a deep channel shaped part 58 corresponding to the part 43 of Figure 15, a fold-over 59 corresponding to part 42 of Figure 15, and tangs at 60 on the part 59 and at 61 on the part 58 all corresponding to the showing in Figure 15. The difference from Figure 15 resides in the provision of an additional limb at the end of the channel 58 opposite channel 57. This limb, in the case of Figure 17, is a bent-up portion 62 provided with tangs 63. In the case of Figure 18, it is a bent-out portion 64 having tangs 65 thereon. In both cases, the portions coact with a stiffening rib 66. In Figure 19 the bent-out limbs are designated by numerals 67 and 68. They are similar in structure and in function to the limbs 62 and 64. However, in Figure 19 the rib or strip 69 corresponding to the rib 66 of Figures 17 and 18 is composed of a plastic material and is provided with a flange 70 of such depth as to insure that it lies proud of the limbs 67 and 68 so that said limbs are not visible through the head lining cloth. In Figure 20 the effective portion 71 of the sealing strip is located immediately above the mouth of the channel 72 and, as shown, is of tubular construction. The attachment portion 73 lies directly beneath the effective portion and parallel to its base. It is gripped by the limb 74 of a clip 75, which closely approximates the clip shown in Figures 9 and 10.

Figure 21:
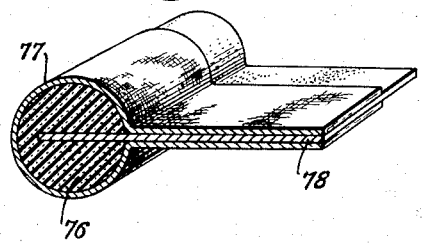
Figures 21 and 22 illustrate alternative forms of sealing strip in accordance with the invention.
Figure 22:
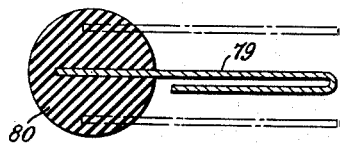

In Figures 21 and 22 there are shown alternative forms of sealing strip in which the soft but resilient effective portion receives diametrically or substantially tangentially the attachment portion. The effective portion 76 of Figure 21 may be provided with a fabric or ornamental covering 77 extending over the diametrical attaching portion 78. The attaching portion can be folded back upon itself as can be seen upon reference to the portion 79 extending from the effective portion 80 which is shown in Figure 22. The broken lines show other alternative positions for the attaching portion 79. The various attachment portions illustrated in the drawing may be of fabric, metal or other suitable material and may take the form of a woven wire or alternatively a length of wire bending to zig-zag formation and covered with a fabric or otherwise.

What is claimed is:

1. An assembly consisting of a sealing strip, a head lining and a plurality of attachment clips which perform the dual function of securing said sealing strip in position upon a supporting flange and holding said head lining in position, said sealing strip including a soft and resilient effective sealing portion and a laterally projecting flange like attachment portion, each clip including two open mouthed channel portions adapted respectively to receive said attachment portion and to engage the supporting flange respectively, the defining limbs of said channel portions having pointed tangs for frictionally engaging said attachment portion and flange, a defining limb of the channel portion which receives the attachment portion being kinked to accommodate the edge of the head lining and having pointed tangs for perforating the head lining to hold the latter firmly in position.

2. An assembly as claimed in claim 1, wherein the effective portion has an integral lip for engaging the supporting flange to make sealing engagement therewith.

3. An assembly as claimed in claim 1, including a head lining stiffening rib around which the edge of the head lining is folded before engagement by the kinked part of the limb of the channel portion which receive the attachment portion.

References Cited in the file of this patent

UNITED STATES PATENTS

| | | |
|---|---|---|
| 1,245,473 | Lent | Nov. 6, 1917 |
| 1,475,916 | Zanella | Nov. 27, 1923 |
| 1,570,186 | Replogle | Jan. 19, 1926 |
| 1,883,815 | Nolan | Oct. 18, 1932 |
| 2,091,791 | Newman | Aug. 31, 1937 |
| 2,091,859 | Johnson | Aug. 31, 1937 |
| 2,144,171 | Van Uum | Jan. 17, 1939 |
| 2,148,848 | Wiley | Feb. 28, 1939 |
| 2,223,459 | Reid | Dec. 3, 1940 |
| 2,485,189 | Churchill | Oct. 18, 1949 |
| 2,554,452 | Bright | May 22, 1951 |
| 2,715,250 | Bedford | Aug. 16, 1955 |